June 21, 1927.
C. W. BURTON, JR
1,632,947
PNEUMATIC GEAR SHIFTING DEVICE
Filed July 9, 1924
2 Sheets-Sheet 1
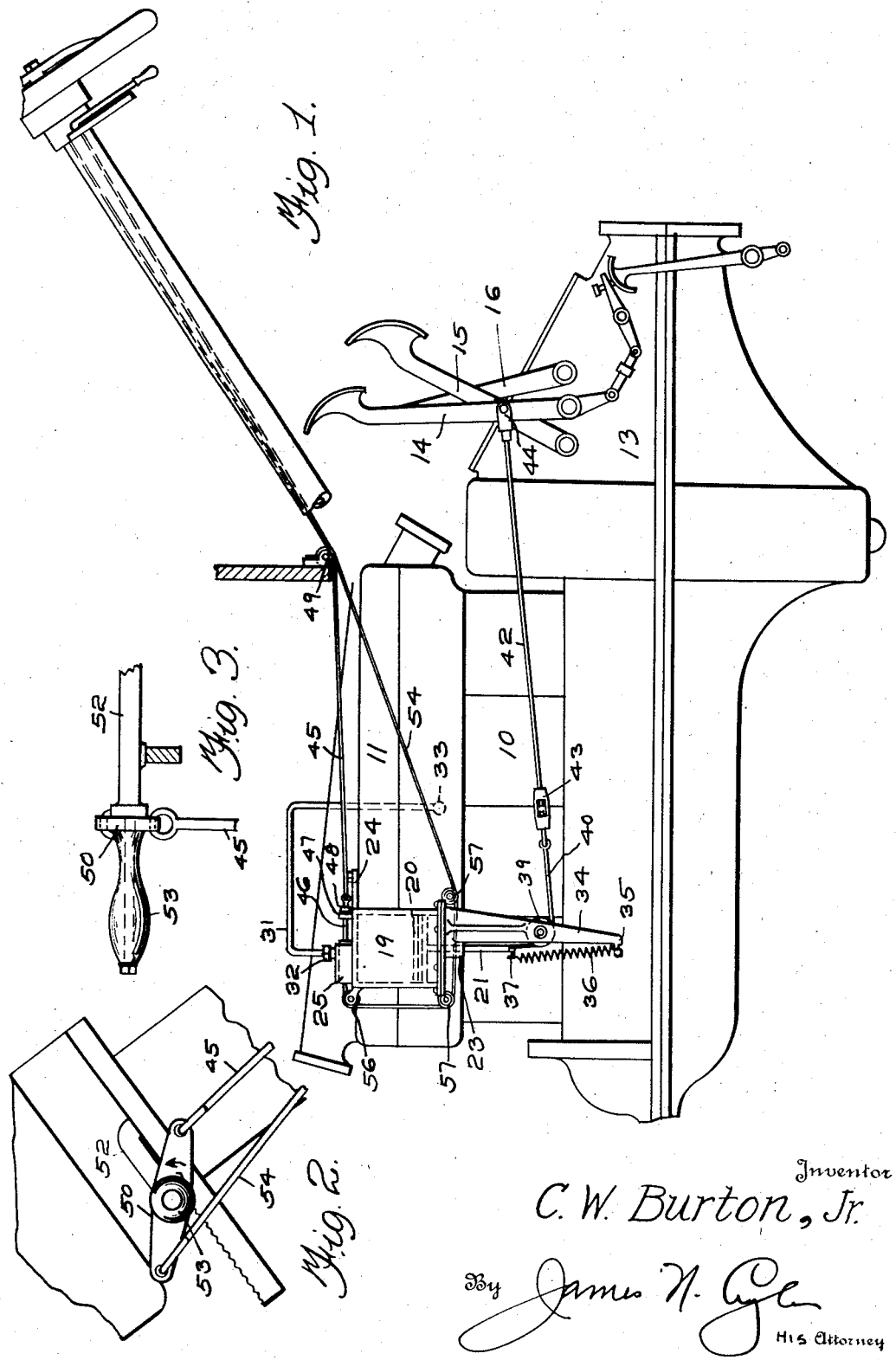
Inventor
C. W. Burton, Jr.
By James N. ...
His Attorney June 21, 1927.  1,632,947
C. W. BURTON, JR
PNEUMATIC GEAR SHIFTING DEVICE
Filed July 9, 1924  2 Sheets-Sheet 2
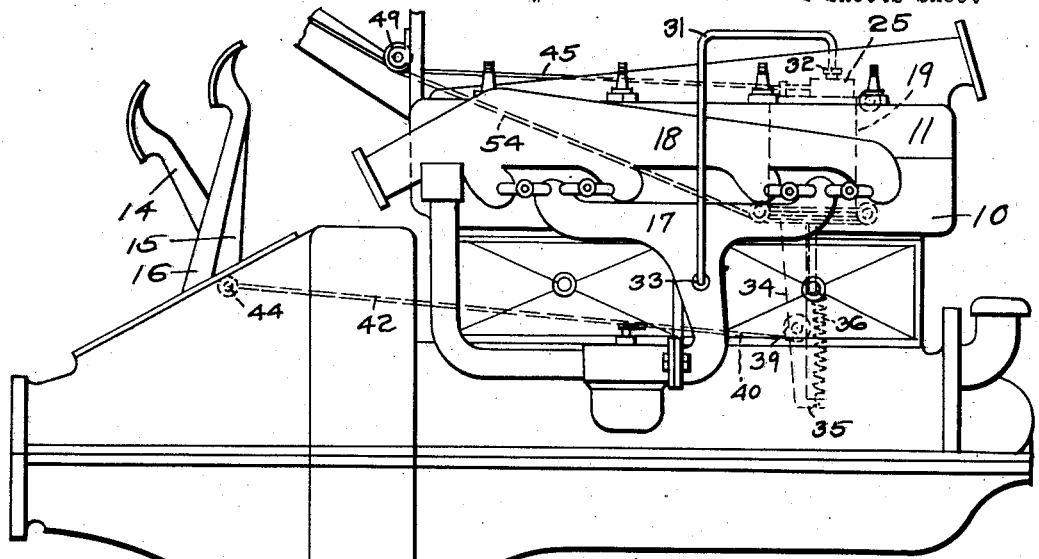
Fig. 4.
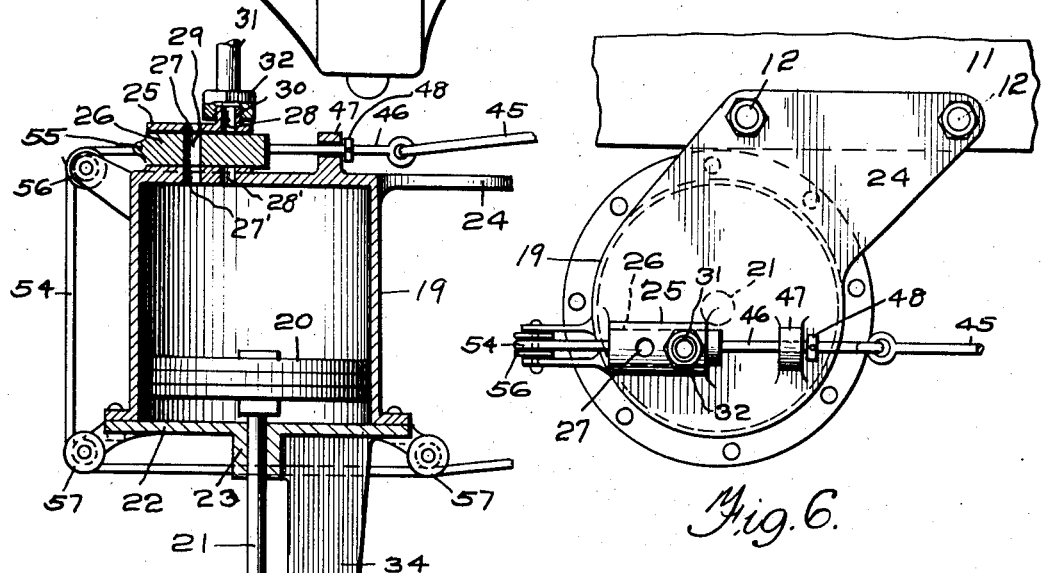
Fig. 5.  Fig. 6.
Inventor
C. W. Burton, Jr.
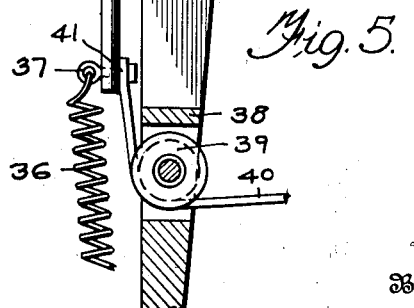
His Attorney Patented June 21, 1927.

1,632,947

UNITED STATES PATENT OFFICE.

CHARLES W. BURTON, JR., OF OCEAN PARK, CALIFORNIA.

PNEUMATIC GEAR-SHIFTING DEVICE.

Application filed July 9, 1924. Serial No. 724,947.

This invention relates to a gear shifting mechanism and has particular reference to such mechanism adapted for use in connection with motor vehicles, and primarily upon the type of vehicle commonly known as the Ford.

It is an object of the invention to provide a means for shifting the usual foot lever into first or low speed position and then allow said lever to move to the high speed position upon the release of such means.

It is a well known fact that the shifting of gears on the Ford car has become highly objectionable to many persons, and especially those who have become accustomed to the sliding gear type of transmission. In many cases the foot slips from the pedal, causing injury to the foot, and usually choking the engine. Aside from these objectionable features, this invention will greatly simplify the driving of Ford cars because of the fact that the speed changes can be made without the use of the foot, allowing the operator to keep his entire attention upon the road.

A further object of the invention resides in such a mechanism, which is operated by a vacuum created in the intake manifold of the engine, such vacuum being communicated to the mechanism by a suitable control valve, which is in turn operated by a hand lever located in a convenient position, such as upon the steering column, directly under the steering wheel.

A further object of the invention resides in the extreme simplicity of the mechanism employed, and its ease of attachment to the cylinder head of the engine. The attachment of the device requires no alteration of the engine, with the exception of a small hole drilled in the side of the intake manifold for the connection of the suction line.

Another object of the invention is the provision of such a device which is extremely simple, strong, durable and highly convenient in operation.

Other important objects and advantages of the invention will be apparent during the course of the following description.

In the accompanying drawings,

Figure 1 is a side elevation of a conventional type of Ford engine and transmission, showing the invention applied thereto, Figure 2 is a side elevation of a valve operating handle for controlling the gear shifting mechanism, Figure 3 is a view at right angle to Figure 2, Figure 4 is a side elevation of the engine, but taken upon the opposite side to that shown in Figure 1, Figure 5 is a view partly in section and partly in elevation of an operating cylinder and associated elements, and, Figure 6 is a plan view thereof.

Referring specifically to the drawings, the numeral 10 designates the conventional Ford engine having the usual head 11 held thereon by bolts 12. Associated with the engine is the conventional type of planetary transmission housing 13, for housing the transmission, not shown, and carrying the usual foot control levers 14, 15 and 16, designating the speed change lever, reverse lever and service brake lever. The usual intake and exhaust manifolds 17 and 18 are employed.

The numeral 19 designates a cylinder, for receiving a piston 20, carried by a piston rod 21. The cylinder is provided with a removable cap 22 having a central bearing 23, through which the rod 21 passes. The cylinder is provided with a lateral extension 24 provided with a plurality of holes to be traversed by the bolts 12 of the engine head, to thereby hold the cylinder 19 and associated elements rigid with respect to the engine. The cylinder 19 is provided upon its top with a housing 25, for receiving an oscillatory valve 26. The housing 25 is provided with a plurality of aligned ports 27, 27', 28 and 28', which communicate with the interior of the cylinder, as clearly shown in Figure 5. The valve 26 is provided with a single port 29, adapted to establish communication alternately with the ports 27, 27' and 28, 28'. The port 28 extends through an exteriorly threaded boss 30 formed upon the housing 25, and is adapted to have connection with a pipe 31, through the medium of a coupling 32. This pipe 31 has connection with the interior of the intake manifold 17 at a point 33, whereby a suction will be established in such pipe at all times during the operation of the engine. Movement of the valve to the right will bring the ports 28, 28' and 29 into registration, in which position the suction in the pipe 31 will be communicated to the interior of the cylinder 19, and causes the piston 20 to be drawn upward in the cylinder. Movement of the valve to the left will cut off the suction, and will establish communication to the atmosphere through the ports 27, 27' and 29, allowing said piston to move downwardly in the cylinder.

The cap 22 is provided with a downwardly extending bracket or support 34, arranged to one side of the travel of the rod 21. This bracket 34 is provided with a hooked end 35 adapted to be engaged with a retractile coil spring 36, the other end of which being connected with the lower end of the rod 20, as shown at 37. The bracket 34 is further provided with an open frame portion 38, in which is rotatably mounted a grooved pulley 39. The pulley is mounted a short distance below the end of the rod 21, as clearly shown. A flexible cable 40 is passed about the pulley 39, and has connection at one end with the rod 21, as shown at 41, and at the opposite end has connection with a rod 42, through the medium of a turn-buckle 43. The rod 42 in turn is connected with the change speed lever 14 as at 44.

The operation of the device so far as described is as follows:

Assuming that the engine is running and that a suction is created in the pipe 31. The operator now desires to engage the low speed lever. The valve 26 is moved to the right, and establishes a suction in the cylinder 19 through the medium of the ports 28, 28' and 29. Such suction causes the piston to be drawn upward in the cylinder 19, which movement will be imparted to the rod 21, flexible cable 40, rod 42, pulling lever 14 forward or into low speed position. After the vehicle has gained sufficient momentum, the valve 26 is moved to the left, which movement relieves the suction, and establishes direct communication between the interior of the cylinder and the atmosphere, allowing the piston to move downward in the cylinder, relieving the cable 40, rod 41, and allowing the lever 14 to move forward, or into the high speed position.

Means are provided to oscillate the valve 26, comprising a flexible cable 45, connected to the valve 26 through the medium of a combined valve stem and guide 46. Movement of the valve in one direction is limited by a lug 47, formed upon the cylinder 19, and through which the stem 46 passes, and movement of the valve in the opposite direction is limited by a collar 48 secured to the stem 46. The limit of movement of the valve in either direction is just sufficient to alternately bring the port 29 into registration with the ports 27, 27' and 28, 28'.

The cable 45 extends over a grooved pulley 49 carried by the dash board, and has connection with a double ended lever 50 as shown at 51. The lever 50 is pivotally mounted upon the usual throttle lever 52, and is revolved by a handle 53. The levers 50 and 52 and the handle 53 are thus utilized for both operating the valve 26 and controlling the feed of fuel to the engine. Means are provided to cause the valve to move to the left or normal position, comprising a flexible cable 54 connected with the valve 26 as at 55. This cable passes over a grooved pulley 56 carried by a bracket formed upon the cylinder 19, and is then passed downwardly and over a pair of grooved pulleys 57 carried by brackets formed upon the cap 22. The cable 54 is then passed over a pulley similar to pulley 49, and thence upward and has connection with the opposite end of the lever 50. It will thus be seen that revolving the handle 53 in the direction shown by the arrow in Figure 2, will pull the cable 45 upwardly and allow the cable 54 to move downwardly, thus causing the valve to slide to the right or operative position. Movement of the handle 53 in the opposite direction will naturally cause the cables to reverse their movement, and cause the valve to move to the left, or inoperative position.

It will thus be seen that an extremely simple and effective device has been provided for operating the low speed mechanism of the Ford automobile. The operation is controlled entirely by hand from the steering post, and will enable the operator to change speeds effectively without the use of his feet. The mechanism employed is of such construction that wear of parts is practically eliminated, and the chance of the parts becoming disarranged, is very remote. The turn buckle in the rod 42 will take up any slight lost motion not already taken up by the lever 14, although this adjustment is not essential.

It is to be understood that the form of the invention herewith shown and described is to be taken as the preferred one, but that various changes in the shape, size and arrangement of parts may be resorted to without departing from the spirit of the invention or the scope of the subjoined claims.

Having described the invention, what I claim is:—

1. In combination an automobile and its transmission gearing, an operating pedal for said gearing, a steering column carried by the automobile for supporting a throttle lever, a cylinder supported upon said engine, a piston operable within said cylinder, flexible means connecting said piston with said operating pedal, means connecting said cylinder with the intake manifold of said engine for creating a suction therein, a valve carried by said cylinder for controlling the suction therein, and means carried upon said throttle lever for controlling the movement of said valve.

2. In combination an automobile, its engine and transmission gearing, an operating pedal for controlling said gearing, a steering column, a throttle lever mounted upon said column for controlling the passage of fuel to said engine, a cylinder supported upon said engine, a piston movable within said cylinder, flexible means connecting said piston with the pedal of the gearing, suction means connected with said cylinder for causing the piston to move to one position, spring means tending to move the piston to the opposite position upon the release of suction in said cylinder, a valve casing carried upon said cylinder, a valve slidable within said casing and flexible means connecting said valve with said throttle lever upon the steering column, whereby said valve and associated parts may be controlled by the operator from said steering column.

3. In combination an automobile, its engine and transmission gearing, an operating pedal for said gearing, a steering column carried by the automobile, a hand operative throttle lever carried upon said column, a rotatable crank carried by said throttle lever, a cylinder carried upon said engine, a piston operable within said cylinder, a piston rod connected with said piston and extending outwardly of said cylinder, a bracket carried by said cylinder and provided with a hook upon its lower end, a pulley rotatably supported upon said bracket, a flexible cable connected with the lower end of said piston rod and extending over said pulley for connection with the pedal of the gearing, a spring connected with said piston rod and the hook end of the bracket for normally moving the piston to the lower extremity, a tubular valve casing supported upon the upper end of the cylinder, a valve slidable within said casing, said casing provided with a plurality of ports establishing communication with the cylinder, said valve provided with a port adapted to alternately establish communication between the ports of the valve casing, a pipe connected with said casing adjacent one of its ports, said pipe having connection with an intake manifold of the engine, for creating a suction within said cylinder when the valve is in a predetermined position, a rigid rod carried by said valve, a guide for said rod formed upon the upper end of said cylinder, a flexible cable connected with said valve rod, upon one side, having connection with the crank upon the throttle, a flexible cable connected with the valve, upon its opposite end, and likewise having connection with the crank upon the throttle, antifriction rollers supported upon said cylinder for receiving the last named flexible cable, means to limit the movement of said valve in either direction, for bringing said cylinder into either an operating position or an exhaust position, and means for adjusting the connection between the piston rod and the operating pedal.

4. In combination an automobile, its engine and transmission gearing, an operating lever for said gearing, a cylinder, a piston operable in said cylinder, a valve carried by said cylinder for controlling said piston, a rod carried by said piston, and extending exteriorly of said cylinder, a bracket carried by said cylinder, and arranged adjacent said rod, a pulley mounted upon said bracket, a cable connecting said rod and the operating lever for the gearing, said cable passing about the pulley, a spring connected with the bracket and the rod, and manually operable means for moving the valve to the operative and inoperative positions, all as substantially shown and described.

In testimony whereof I affix my signature.

CHARLES W. BURTON, Jr.